United States Patent [19]

Deputato

[11] 4,292,553
[45] Sep. 29, 1981

[54] APPARATUS FOR GENERATING MECHANICAL ENERGY RESPONSIVE TO INTERACTION OF MAGNETIC FIELDS

[76] Inventor: Frank V. Deputato, 1116 79th St., North Bergen, N.J. 07047

[21] Appl. No.: 6,184

[22] Filed: Jan. 24, 1979

Related U.S. Application Data

[63] Continuation of Ser. No. 789,072, Apr. 20, 1977, abandoned.

[51] Int. Cl.$^3$ .............................................. H02K 7/00
[52] U.S. Cl. ...................................... 310/46; 310/112
[58] Field of Search .......................... 310/46, 103, 112

[56] References Cited

U.S. PATENT DOCUMENTS

| | | | |
|---|---|---|---|
| Re. 29,165 | 3/1977 | Bode | 310/103 X |
| 1,859,643 | 5/1932 | Worthington | 310/46 |
| 1,863,294 | 6/1932 | Bogia | 310/46 |
| 4,169,983 | 10/1979 | Felder | 310/46 |

*Primary Examiner*—Donovan F. Duggan
*Attorney, Agent, or Firm*—Howard N. Sommers

[57] ABSTRACT

An apparatus for generating mechanical energy responsive to the interaction of a plurality of magnetic fields so as to generate increased mechanical energy from a given quantity of electrical energy as compared with presently known devices, and so as to increase efficiency and enable conservation of electrical energy, which includes a permanent magnet, an electrical conductor connected to a source of electrical current, a core about which the electrical conductor is wound, positionable adjacent the permanent magnet and comprised of material which is magnetizable by operation of the magnetic field of the permanent magnet thereon or by the flow of electrical current from the source through the electrical conductor wound about the core, a plurality of permanent magnets, and means for supporting the plurality of permanent magnets in a position relative to the permanent magnet and core such that a portion of the path of movement of the plurality of permanent magnets is adjacent the position of the permanent magnet and core, including a pair of shafts, and a pair of support discs each secured to each shaft, with each set of a plurality of permanent magnets secured to the perimeter of each support disc at spaced apart locations thereabout such that opposite ends thereof extend outwardly therefrom.

13 Claims, 3 Drawing Figures

APPARATUS FOR GENERATING MECHANICAL ENERGY RESPONSIVE TO INTERACTION OF MAGNETIC FIELDS

This is a continuation of application Ser. No. 789,072 filed Apr. 20, 1977 now abandoned.

BACKGROUND OF THE INVENTION

This invention relates generally to an apparatus for generating mechanical energy, and relates specifically to an apparatus for generating mechanical energy responsive to the interaction of a plurality of magnetic fields.

Presently known devices for generating mechanical energy include electric motors which include a stationary permanent magnet, a coil which is free to rotate between the poles of the stationary permanent magnet, and which comprises an electromagnet when current passes therethrough, and a commutator which alternately reverses the direction of current in the coil. Such devices consume large amounts of electrical energy and are inefficient and wasteful in the use of electrical energy.

SUMMARY OF THE INVENTION

In view of the problems with presently known devices set forth above, one of the objects of this invention is to provide an apparatus for generating increased mechanical energy from a given quantity of electrical energy as compared with presently known devices so as to increase efficiency and enable conservation of electrical energy.

The above object as well as other objects of this invention are provided for in this invention by means of an apparatus for generating mechanical energy responsive to the interaction of a plurality of magnetic fields, which includes a permanent magnet, an electrical conductor connected to a source of electrical current, a core about which the electrical conductor is wound, positionable adjacent the permanent magnet and comprised of material which is magnetizable by operation of the magnetic field of the permanent magnet thereon or by the flow of electrical current from the source through the electrical conductor wound about the core, a plurality of permanent magnets, and means for supporting the plurality of permanent magnets in a position relative to the permanent magnet and core such that a portion of the path of movement of the plurality of permanent magnets is adjacent the position of the permanent magnet and core, including a pair of shafts, and a pair of support discs each secured to each shaft, with each set of a plurality of permanent magnets secured to the perimeter of each support disc at spaced apart locations thereabout such that opposite ends thereof extend outwardly therefrom.

DESCRIPTION OF THE DRAWINGS

This invention is illustrated, by way of example, in the accompanying drawings, wherein.

DESCRIPTION OF THE PREFERRED EMBODIMENT

Figure 1:
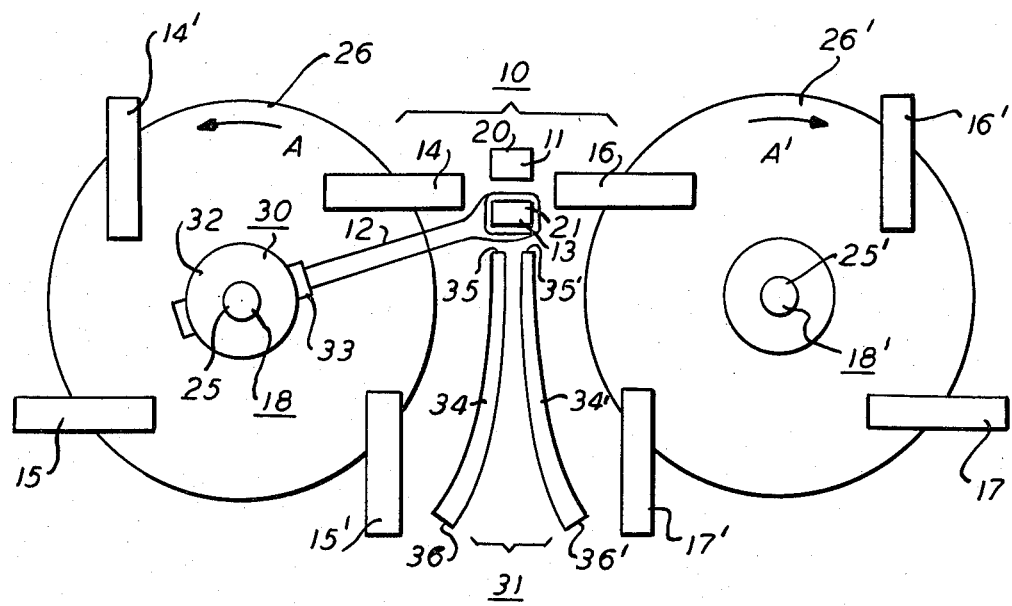
FIG. 1 is a side elevational view of one embodiment of a mechanical energy generating apparatus pursuant to this invention.
Figure 2:
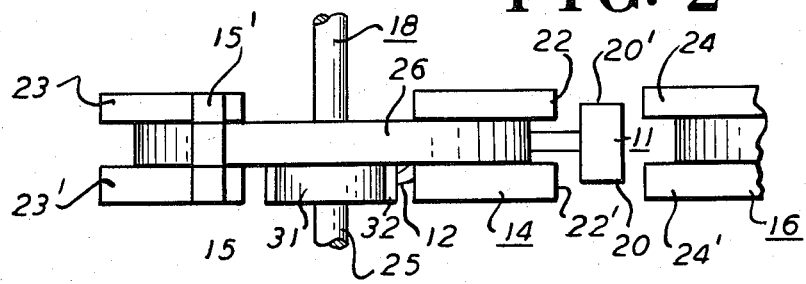
FIG. 2 is a top plan view of a portion thereof.
Figure 3:
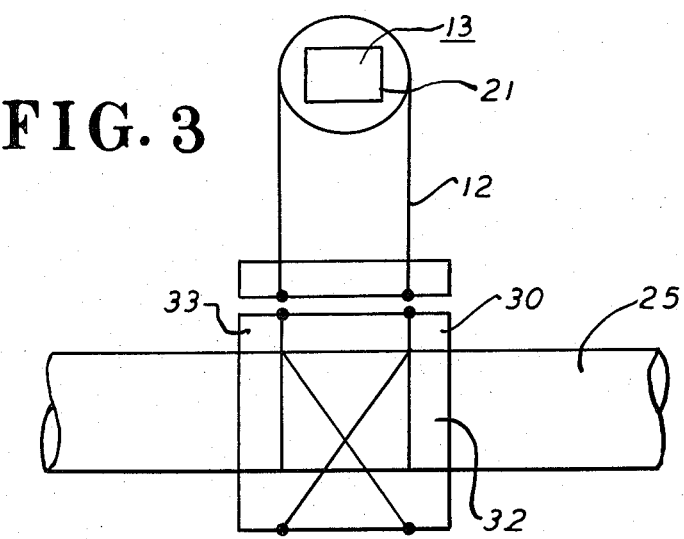
FIG. 3 is a side elevational view of the electromagnet and commutator portion of the mechanical energy generating apparatus pursuant to this invention.

As illustrated in FIGS. 1-3, the apparatus 10 for generating mechanical energy responsive to the interaction of a plurality of magnetic fields comprises, for example, a permanent magnet 11, an electrical conductor 12 connected to a source of electrical current, a core 13 about which the electrical conductor 12 is wound, positionable adjacent the permanent magnet 11, and comprised of magnetizable material, magnetizable by operation of the magnetic field of the permanent magnet 11 thereon, and magnetizable by the flow of electrical current from the source of electrical current through the electrical conductor 12 wound about the core 13, a plurality of permanent magnets 14, 14', 15, 15', 16, 16', 17, and 17', and means 18, 18' for supporting the plurality of permanent magnets 14, 14', 15, 16', 16, 16', 17, and 17' in a position such that the magnetic fields of the permanent magnet 11 and core 13 interact with the magnetic fields of the plurality of permanent magnets 14, 14', 15, 15', 16, 16', and 17, and 17', so as to generate mechanical energy thereby.

The permanent magnet 11 is generally bar-shaped, and includes opposite ends 20, 20' which comprise poles of opposite plurality. The core 13 is generally bar-shaped, and includes opposite ends 21, 21' which are magnetizable as poles of opposite plurality. Each of the plurality of permanent magnets 14, 14', 15, 15', 16, 16', 17, and 17', is generally horseshoe-shaped and includes opposite ends, such as 22, 22', 23, 23', 24, and 24', which comprises poles of opposite polarity. The means 18, 18' for supporting the plurality of permanent magnets 14, 14', 15, 15', 16, 16', 17, and 17' include a pair of shafts 25, 25', and a pair of support discs 26, 26' each secured to one of the shafts 25, 25', with each of the plurality of permanent magnets 14, 14', 15, 15', 16, 16', 17, and 17', at perimeter of one of the support discs 26, 26' at spaced apart locations thereabout such that the opposite ends of such permanent magnets, such as 22, 22', 23, 23', 24, and 24', extend outwardly from such support discs 26, 26'.

The apparatus 10 further includes a commutator 30, connected to the source of electrical current and to the electrical conductor 12, and means 31 for extending the magnetic field of the core 13. The commutator 30 includes a rotatable portion 32 connected to the source of electrical current and mounted on the shaft 25, and a fixed portion 33 connected to the electrical conductor 12. The means 31 for extending the magnetic field of the core 13 comprises a pair of bridges 34, 34' which are comprised of magnetizable material, each of which includes ends 35, 35' positionable adjacent the core 13, and opposite ends 36, 36' positionable adjacent a portion of the path of movement of the plurality of permanent magnets 14, 14', 15, 15', 16, 16', 17, and 17'.

The apparatus 10 is operable from an initial configuration thereof, as illustrated in FIG. 1, for example, with the opposite end poles 22, 22', and 24, 24' of permanent magnets 14 and 16 respectively positioned opposite to and proximate the opposite end poles 20, 20' of permanent magnet 11 and opposite to and proximate the end poles 21, 21' of core 13, such that, for example, end pole 20 of permanent magnet 11 which is of "N" polarity, is disposed opposite to and proximate end pole 22 of permanent magnet 14 which is of "N" polarity and end 21 of core 13, and such that end pole 20' of permanent magnet 11 which is of "S" polarity, is disposed opposite to and proximate end pole 22' of permanent magnet 14 which is of "S" polarity and end 21' of core 13.

Electrical current from the source is then conducted through the commutator 30, whereby current is conducted through electrical conductor 12 and about the core 13, so as to magnetize core 13 such that end pole 21 becomes an "N" pole, proximate to which is "N" pole 22 of permanent magnet 14, and opposite end 21' of core 13 becomes an "S" pole, proximate to which is "S" pole 22' of permanent magnet 14, whereupon the proximate like poles, including "N" poles 20 of permanent magnet 11, 21 of core 13, and 22 of permanent 14 and 24 of permanent magnet 16, and "S" poles 20' permanent magnet 11, 21' of core 13, and 22' of permanent magnet 14 and 24' of permanent magnet 16, repel, so as to generate a "push" which generates rotation of support discs 26, 26' and support shafts 25, 25' in the directions of arrows "A", "A'"; the "push" provided by permanent magnet 11 is provided without the expenditures of electrical energy.

As the permanent magnets 14 and 16 move away from the permanent magnet 11 and core 13, the portion of the commutator 30 mounted on the support shaft 25 rotates in the direction of arrow "A" to a position where electrical current from the source is no longer conducted through the commutator 30, whereby no current is conducted through electrical conductor 12 and about the core 13, so that the core 13 is de-magnetized. The proximate opposite end poles 20, 20' of permanent magnet 11 then induce magnetization of the core 13 such that end pole 21 becomes an "S" pole, and end pole 21' becomes an "S" pole, towards which the "N" and "S" poles respectively of permanent magnets 15' and 17' rotate, whereupon the proximate opposite poles, including "S" pole of core 13 and "N" poles of permanent magnets 15' and 17', and "N" pole of core 13 and "S" poles of permanent magnets 15' and 17' generate a "pull" which generates further rotation of support discs 26, 26' and support shafts 25, 25' in the directions of arrows "A", "A'"; the "pull" provided by induced magnetism in core 13 from permanent magnet 11 is provided without the apenditure of electrical energy. The magnetically induced polarized end poles 21, 21' of core 13 induce magnetization of the ends 35, 35' of bridges 34, 34' proximate thereto, such that the portions of the ends 35, 35' of bridges 34, 34' proximate the "S" end pole 21' of core 13 become "N" poles, and the portions of the ends 35, 35' of bridges 34, 34' proximate the "N" end pole 21 of core 13 becomes "S" poles, and such that the portions of ends 36, 36' of bridges 34, 34' on the same sides thereof as "N" pole portions of ends 35, 35' become "S" poles, and the portions of ends 36, 36' of bridges 34, 34' on the same sides thereof as "S" pole portions of ends 35, 35' become "N" poles, so that "S" pole portion of ends 36, 36' of bridges 34, 34' are proximate to the path of movement of and attract "N" pole ends of permanent magnets 15', 17', and "N" pole portions of ends 36, 36' of bridges 34, 34' are proximate to the path of movement of and attract "S" pole ends of permanent magnets 15', 17', so as to generate a "pull" which generates further rotation of support discs 26, 26' and support shafts 25, 25' in the directions of arrows "A", "A'"; the "pull" provided by induced magnetism in bridges 35, 35', from permanent magnet 11 through core 13 is provided without the expenditure of electrical energy.

As the permanent magnets 15', 17' move into positions generally opposite to and proximate the core 13, the rotatable portion 33 of commutator 30 mounted on the support shaft 25 rotates in the direction of arrow "A" to a position where electrical current is conducted therethrough, whereupon the above operations are repeated.

The invention has been set forth above in terms of a specific embodiment thereof. Variations in the specific embodiment set forth above may be made by those skilled in the art, which variations may nevertheless be within the scope and spirit of the invention. In view thereof, the invention, therefore, is to be broadly construed within the scope and spirit of the claims appended hereto.

I claim:

1. An apparatus for generating mechanical energy responsive to the interaction of magnetic fields, comprising:
   (a) a permanent magnet;
   (b) a core comprised of magnetizable material positionable proximate to, but not in contact with, the permanent magnet within the influence of the magnetic field emanating from the permanent magnet;
   (c) a conductor wound about the core;
   (d) a plurality of permanent magnets;
   (e) means for supporting the plurality of permanent magnets, movable in response to the interaction of magnetic fields so as to move the permanent magnets to positions proximate the permanent magnet and magnetized core within the influence of the magnetic fields emanating therefrom;
   (f) means for alternately conducting and not conducting electricity through the conductor, such that when electricity is conducted therethrough, magnetism is induced by flow of electricity about the core, of polarity such that the core repels each one of the plurality of permanent magnets as it moves to a position proximate thereto, and when electricity is not conducted, magnetism is induced in the core by the permanent magnet, of polarity such that the core attracts each one of the plurality of permanent magnets as it moves to a position proximate thereto, with the conductive cycle timed to coincide with the proximity to the core and permanent magnet of each one of the plurality of permanent magnets and with the nonconductive cycle timed to coincide with the approach to the core and permanent magnet of each one of the plurality of permanent magnets; and
   (g) means for generating mechanical energy responsive to movement of the supporting means.

2. An apparatus as in claim 1, in which the plurality of permanent magnets comprise a first plurality of permanent magnets, the means for supporting the plurality of permanent magnets comprise a first means for supporting the first plurality of permanent magnets, further comprising a second plurality of permanent magnets, second means for supporting the second plurality of permanent magnets, movable in response to the interaction of magnetic fields so as to move the second plurality of permanent magnets to positions proximate the permanent magnet and magnetized core within the influence of the magnetic fields emanating therefrom, and means for generating mechanical energy responsive to movement of the second means for supporting the second permanent magnets, and in which the means for alternately conducting and not conducting electricity through the conductor are operable such that when electricity is conducted therethrough, magnetism is induced by flow of electricity about the core, of polarity such that the core repels each one of the first plurality of permanent magnets and second plurality of permanent magnets as they move to positions proximate thereto, and when electricity is not conducted, magnetism is induced in the core by the permanent magnet, of polarity such that the core attracts each one of the first plurality of permanent magnets and second plurality of permanent magnets as they move to positions proximate thereto, with the conductive cycle timed to coincide with the proximity to the core and permanent magnet of each one of the first plurality of permanent magnets and second plurality of permanent magnets, and with the nonconductive cycle timed to coincide with the approach to the core and permanent magnet of each one of the first plurality of permanent magnets and second plurality of permanent magnets.

3. An apparatus as in claim 1, in which the permanent magnet is generally bar-shaped, and includes opposite ends which comprise poles of opposite polarity.

4. An apparatus as in claim 1, in which the core is generally bar-shaped, and includes opposite ends which are magnetizable as poles of opposite polarity.

5. An apparatus as in claim 1, in which each of the plurality of permanent magnets are generally horseshoe-shaped and include opposite ends which comprise poles of opposite polarity.

6. An apparatus as in claim 1, in which the means for supporting the plurality of permanent magnets comprise a shaft, and a support disc secured to the shaft, in which the shaft and support disc are positionable such that a portion of the path of movement of the plurality of permanent magnets secured thereto and extending therefrom is proximate the position of the permanent magnet and core.

7. An apparatus as in claim 1, further comprising a commutator, connected to the source of electrical energy and to the electrical conductor.

8. An apparatus as in claim 1, further comprising means for extending the magnetic field of the core.

9. An apparatus as in claim 5, in which the means for supporting the plurality of permanent magnets comprise a shaft, and a support disc secured to the shaft, and in which the plurality of permanent magnets are each secured to the perimeter of the support disc at spaced apart locations thereabout such that the opposite ends thereof extend outwardly therefrom.

10. An apparatus as in claim 1, in which the means for supporting the plurality of permanent magnets comprise a plurality of shafts, and a plurality of support discs each secured to one of the shafts, in which each support shaft includes a plurality of permanent magnets secured to the perimeter thereof at spaced apart locations thereabout such that opposite ends of each such permanent magnet extend outwardly therefrom, positionable such that a portion of the path of movement of each of the plurality of permanent magnets secured thereto and extending therefrom is proximate the position of the permanent magnet and core.

11. An apparatus as in claim 6, further comprising a commutator which comprises a rotatable portion connected to the source of electrical energy and mounted on the shaft, and a fixed portion connected to the electrical conductor.

12. An apparatus as in claim 8, in which the means for extending the magnetic field of the core comprises a bridge comprised of magnetizable material, one end of which is positionable proximate the core, the opposite end of which is positionable proximate a portion of the path of movement of the plurality of permanent magnets.

13. An apparatus as in claim 8, in which the means for extending the magnetic fields of the core comprise a plurality of bridges, each comprised of magnetizable material, and each having one end positionable proximate the core, and the opposite end positionable proximate a portion of the path of movement of a plurality of permanent magnets.

* * * * *